UNITED STATES PATENT OFFICE.

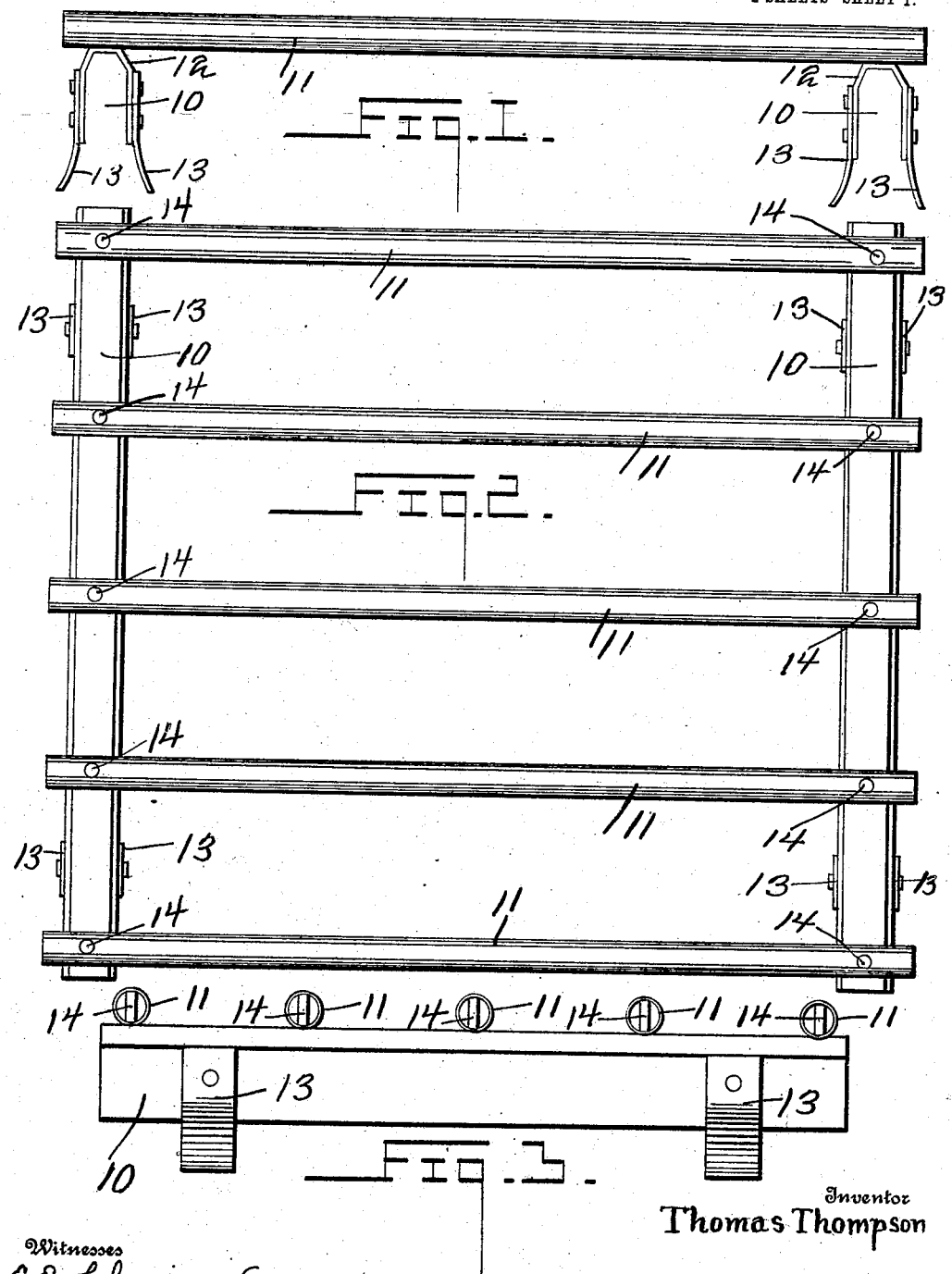

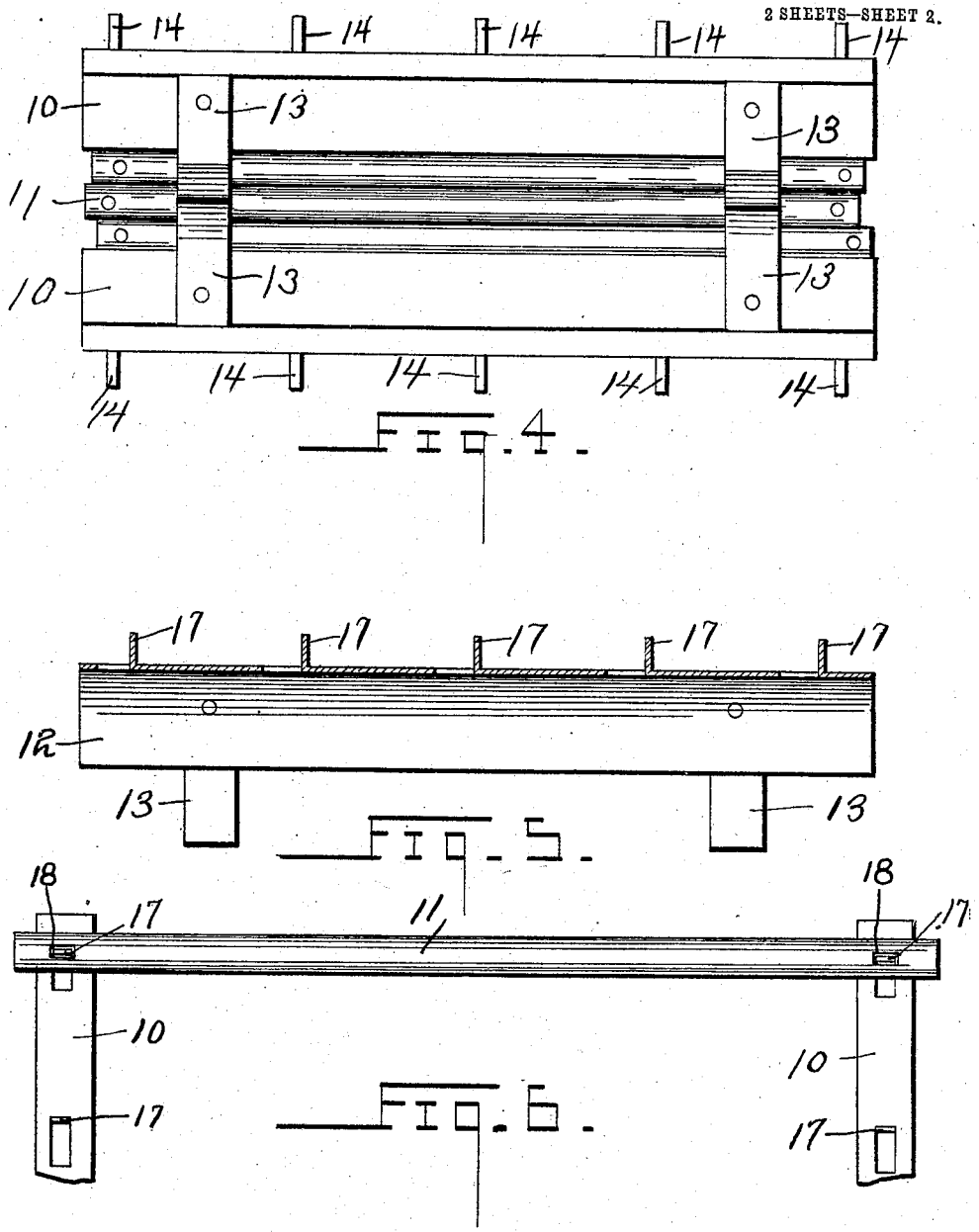

THOMAS THOMPSON, OF CAMBRIDGE, NEBRASKA.

ROOST.

No. 911,920.     Specification of Letters Patent.     Patented Feb. 9, 1909.

Application filed August 28, 1908. Serial No. 450,677.

*To all whom it may concern:*

Be it known that I, THOMAS THOMPSON, a citizen of the United States, residing at Cambridge, in the county of Furnas and State of Nebraska, have invented certain new and useful Improvements in Roosts, of which the following is a specification.

This invention relates to farm apparatus, and more particularly to roosts for fowls, and has for its object to provide a portable and adjustable roost of a novel and desirable type.

An object of the invention is to provide such a device which may be easily dismantled for cleansing, and which will not tend to produce unsanitary conditions.

Another object is to provide such a device which may be manufactured at low cost from stock material.

Another object is to provide a roost of detachable sections which will be adapted to be packed into small space for shipment, and storage.

Other objects and advantages will be apparent from the following description, and it will be understood that changes in the specific structure shown and described may be made within the scope of the claims, and that any suitable materials may be used without departing from the spirit of the invention.

In the drawings forming a portion of this specification, and in which like numerals of reference indicate similar parts in the several views, Figure 1 is an end view of the device in operative position, Fig. 2 is a top view of the device in similar position, Fig. 3 is a side view of the device, Fig. 4 is a view of the device dismantled and disposed for shipment, Fig. 5 is a longitudinal sectional view of a modified form of base for the device, Fig. 6 is a view of a modified form of roost for use with the above base.

Referring to the drawings, there is shown a roost comprising bases 10 and having a plurality of roosts 11 disposed laterally thereacross. The bases 10 include strips of sheet metal 12 bent longitudinally to present their opposite sides in spaced relation to form U shaped beams, and having pendent legs 13 secured outwardly thereof. A plurality of spaced pins 14 are carried by the member 12, projecting upwardly and adapted for detachable engagement in openings formed through the roosts 11. The roost members comprise sections of pipe having openings formed therethrough at suitable points for engagement over the pins 14 carried by the members 12.

When it is desired to ship or store the device, the roosts may be removed and disposed between the opposite sides of the members 12 and the legs 13, and the two base members brought together with their legs in overlapping relation with the members 12 and suitably secured in that position. It will thus be seen that the roost members will be suitably confined with a minimum of labor and expense in packing.

In Fig. 5 there is shown a modification of the base members in which the members 12 have a series of projections 17 stamped upwardly from their central portion, and adapted to engage in slots 18 formed in the roost members as shown in Fig. 6. The cost of production of this form of the invention is greatly lessened over that of the preferred form.

What is claimed is:

1. As an article of manufacture, a roost comprising a support including a cross beam, U shaped in cross section, legs secured to the beam on opposite sides, extending oppositely of the closed portion of the beam, and a plurality of pins spaced longitudinally of the beam, and extending outwardly from the closed portion, and a plurality of roost members having perforations therethrough adapted for detachable engagement over the pins, said support members being adapted to be disposed with legs opposed, to receive said roost members therebetween and within the U shaped beam, for retention therein during shipment or transportation.

2. In a roost of the class described, the combination with a plurality of roost members having perforations therethrough, of support members comprising a strip of sheet material bent to U shape in cross section, and having integral projections stamped outwardly from its closed portion, and adapted for detachable engagement in the openings in the roost, and leg members secured to opposite sides of the U shaped member.

In testimony whereof I affix my signature, in presence of two witnesses.

THOMAS THOMPSON.

Witnesses:
   G. E. SIMON,
   G. O. JOHNSON.